United States Patent
Park et al.

(10) Patent No.: US 8,040,656 B2
(45) Date of Patent: Oct. 18, 2011

(54) ARRAY VARIABLE CAPACITOR APPARATUS

(75) Inventors: Yun-Kwon Park, Dongducheon-Si (KR); Jea-Shik Shin, Suwon-Si (KR); Yong-Kweon Kim, Seoul (KR); Yong-Seung Bang, Seoul (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 461 days.

(21) Appl. No.: 12/253,587

(22) Filed: Oct. 17, 2008

(65) Prior Publication Data

US 2009/0185325 A1 Jul. 23, 2009

(30) Foreign Application Priority Data

Jan. 23, 2008 (KR) .................. 10-2008-0007191

(51) Int. Cl.
*H01G 5/00* (2006.01)

(52) U.S. Cl. ........ 361/277; 361/273; 361/278; 361/279; 361/283.3; 361/290

(58) Field of Classification Search .................. 361/277, 361/272–273, 278–279, 283.2, 283.3, 290–292, 361/283.1

See application file for complete search history.

(56) References Cited

U.S. PATENT DOCUMENTS

| | | | | |
|---|---|---|---|---|
| 6,088,214 A | * | 7/2000 | Malone et al. | 361/278 |
| 6,229,684 B1 | * | 5/2001 | Cowen et al. | 361/278 |
| 6,377,438 B1 | * | 4/2002 | Deane et al. | 361/278 |
| 6,701,779 B2 | * | 3/2004 | Volant et al. | 73/105 |
| 6,897,537 B2 | | 5/2005 | De Los Santos | |
| 7,148,604 B2 | * | 12/2006 | Inoue et al. | 310/322 |
| 7,251,121 B2 | * | 7/2007 | Bhutta | 361/328 |
| 7,423,501 B2 | * | 9/2008 | Kim et al. | 333/187 |

* cited by examiner

*Primary Examiner* — Nguyen T Ha
(74) *Attorney, Agent, or Firm* — NSIP Law

(57) ABSTRACT

An array variable capacitor apparatus includes a line unit including a ground line and a signal line which operates as a lower electrode; and a plurality of plates which are engaged with the line unit to generate capacitance and which operate as upper electrodes, the plurality of plates being arranged in an array pattern and having different degrees of stiffness.

10 Claims, 4 Drawing Sheets

US 8,040,656 B2

ARRAY VARIABLE CAPACITOR APPARATUS

CROSS-REFERENCE TO RELATED APPLICATIONS

This application claims priority from Korean Patent Application No. 10-2008-0007191, filed on Jan. 23, 2008, in the Korean Intellectual Property Office, the disclosure of which is incorporated herein by reference in its entirety.

BACKGROUND OF THE INVENTION

1. Field of the Invention

The present invention relates to an array variable capacitor apparatus, and more particularly, to a variable capacitor apparatus in which variable capacitors having different degrees of stiffness are arranged in an array pattern.

2. Description of the Related Art

Radio frequency (RF) systems for processing RF signals require matching circuits or tunable filters to transceive information using wide-band or multi-band frequencies. Matching circuits or tunable filters may be implemented using a plurality of capacitor arrays.

For example, a tunable filter may employ a variable capacitor using a varactor. However, the range within which such a variable capacitor is able to be tuned to signals is limited, so it is impossible to tune to signals having variable ranges. Additionally, the quality coefficient Q of the variable capacitor may change so that performance of the filter may be reduced, and power loss can be increased.

Alternatively, a matching circuit or a tunable filter fabricated using micro-electro-mechanical systems (MEMS) technology requires an additional switch because such circuits or filters employ fixed capacitor arrays or variable capacitor arrays. Accordingly, if a matching circuit or tunable filter is fabricated using a fixed capacitor array or a variable capacitor array, the size and manufacturing costs of the matching circuit or tunable filter may increase. Additionally, an increase in parts such as switches causes insertion loss in RF signals to increase.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an array variable capacitor apparatus which is able to perform wide-band or multi-band tuning without using a passive element such as a switch in an radio frequency (RF) system.

According to an aspect of the present invention, there is provided an array variable capacitor apparatus including a line unit comprising a ground line and a signal line which operates as a lower electrode; and a plurality of plates which are engaged with the line unit to generate capacitance and which operate as upper electrodes, the plurality of plates being arranged in an array pattern and having different degrees of stiffness.

If a driving voltage is applied, an electrostatic force may cause the plurality of plates to move toward the line unit and to generate the capacitance, and a gap between the upper electrode and the lower electrode may change according to the stiffness.

The stiffness of each of the plurality of plates may be proportional to the size of the gap, but may be inversely proportional to the capacitance.

The stiffness of each of the plurality of plates may be adjusted according to at least one from among Young's modulus of each of the plurality of plates, the thickness of each of the plurality of plates and an area overlapping between each of the plurality of plates and the signal line.

The plurality of plates may be spaced apart from an upper portion of the line unit and arranged in an array pattern.

The apparatus may further include a plurality of support units for supporting the plurality of plates so that the plurality of plates are separated from the line unit. The plurality of support units may have different degrees of stiffness.

Each pair of the plurality of support units may be disposed at respective ends of each of the plurality of plates so as to form a bridge shape. The plurality of support units may be disposed in membrane forms at edges of each of the plurality of plates.

If the applied driving voltage reaches a pull-in voltage of at least one plate from among the plurality of plates, a gap between the at least one plate and the signal line may be reduced to the minimum level so that the capacitance may reach the maximum value.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Figure 1:
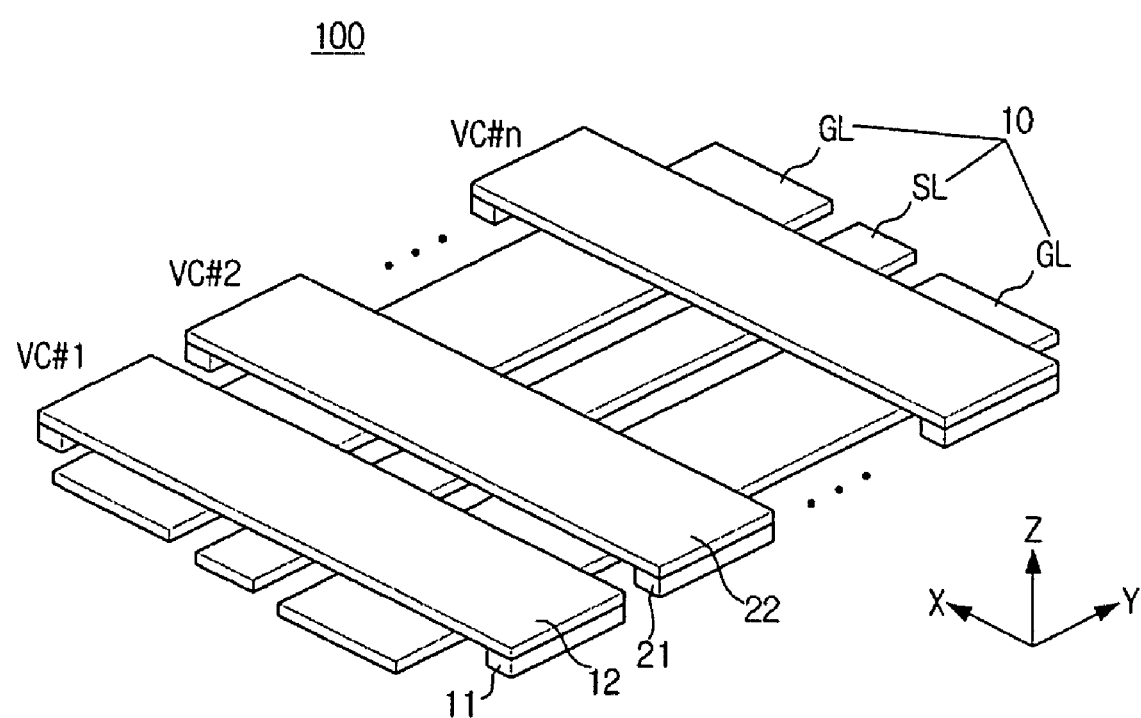
FIG. 1 illustrates an array variable capacitor apparatus according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

Figure 2:
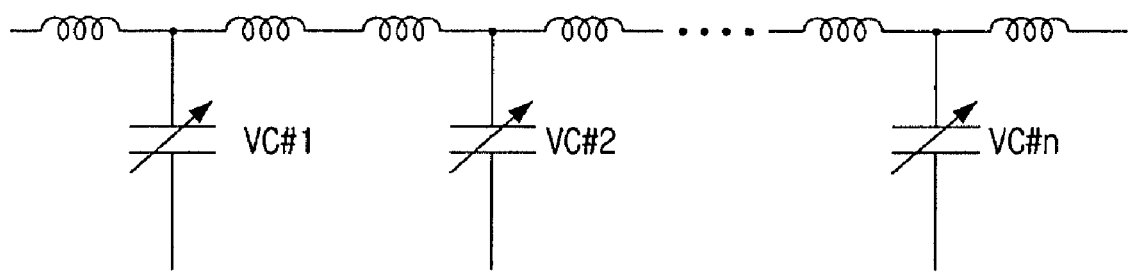
FIG. 2 schematically illustrates an equivalent circuit shown in FIG. 1.

FIG. 1 illustrates an array variable capacitor apparatus 100 according to an exemplary embodiment of the present invention, and FIG. 2 schematically illustrates an equivalent circuit shown in FIG. 1. The variable capacitor apparatus 100 of FIG. 1 enables wide-band tuning or multi-band tuning using a plurality of variable capacitors VC#1, VC#2, . . . , VC#n, and may be employed in a matching circuit or a tunable filter of a radio frequency (RF) front end. The equivalent circuit shown in FIG. 2 illustrates that first to n-th capacitors VC#1, VC#2, ..., VC#n operate as variable capacitors.

A matching circuit refers to a circuit for impedance matching in an RF system such as an RF front end. For example, in order to design an RF system having impedance of approximately 50 ohm, if impedance of an antenna and impedance of a device connected to the antenna are adjusted to be approximately 70 ohm and 100 ohm, respectively, a matching circuit may be connected between the antenna and the device and may cause the impedance to be approximately 50 ohm. Here, the matching circuit includes an inductor and a capacitor. If the RF system is able to perform multi-band tuning, there may also be provided a plurality of matching circuits.

A tunable filter refers to a filter for selectively filtering frequencies according to the magnitude of capacitance so that only desired frequencies are obtained. The tunable filter includes an inductor and a capacitor.

Referring to FIG. 1, the variable capacitor apparatus 100 includes a line unit 10, a plurality of support units 11, 21, ..., (10m+1), and a plurality of plates 12, 22, ..., (10n+2). Here, m and n are positive integers. The line unit 10 includes a ground line GL and a signal line SL, which operates as a lower electrode and transmits signals. For example, if the variable capacitor apparatus 100 is employed in the RF system, the signal line SL may transmit RF signals. The line unit 10, support unit 11 and plate 12 are combined to operate as a single variable capacitor VC#1. The variable capacitors VC#1, VC#2, ..., VC#n may be fabricated using a micro-electro-mechanical systems (MEMS) technology, which has become well-known, so detailed description thereof is omitted.

The plurality of support units 11, 21, ..., (10m+1) support the plurality of plates 12, 22, ..., (10n+2) so that the plurality of plates 12, 22, ..., (10n+2) are spaced apart by a predetermined distance from the line unit 10. The stiffness of the plurality of support units 11, 21, ..., (10m+1) may be the same or different. Each pair of the plurality of support units 11, 21, ..., (10m+1) may be disposed at respective ends of each of the plurality of plates 12, 22, ..., (10n+2) so as to form a bridge shape.

The plurality of plates 12, 22, ..., (10n+2) may operate as upper electrodes, and may be engaged with the line unit 10 to operate as variable capacitors VC#1, VC#2, ..., VC#n. Each of the plurality of plates 12, 22, ..., (10n+2) is separated from the line unit 10 in the direction of the Z axis shown in FIG. 1 by the plurality of support units 11, 21, ..., (10m+1). If each of the plurality of plates 12, 22, ..., (10n+2) has different degrees of stiffness, the different degrees of stiffness may affect the capacitances $C_1, C_2, \ldots, C_n$ of the variable capacitors VC#1, VC#2, ..., VC#n. Accordingly, the variable capacitor apparatus 100 is able to perform not only wide-band tuning but also multi-band tuning.

Each of the plurality of plates 12, 22, ..., (10n+2) may be fabricated of metal. The stiffness of each of the plurality of plates 12, 22, ..., (10n+2) may be adjusted according to the type of media, or Young's modulus and the thickness of each of the plurality of plates. Here, Young's modulus is a measure of the stiffness of the material.

If a driving voltage is applied, the plurality of plates 12, 22, ..., (10n+2) may move toward the line unit 10 so as to generate a capacitance. The capacitance is represented by the following Equation 1.

$$c = \varepsilon \frac{S}{d}$$ [Equation 1]

In which, E represents the permittivity of a dielectric, namely an air gap, between each of the plurality of plates 12, 22, ..., (10n+2) and the signal line SL; d represents a gap between each of the plurality of plates 12, 22, ..., (10n+2) and the signal line SL; and S represents an area overlapping between each of the plurality of plates 12, 22, ..., (10n+2) and the signal line SL.

Referring to Equation 1, the capacitances $C_1, C_2, \ldots, C_n$ generated by each of the variable capacitors VC#1, VC#2, ..., VC#n may be affected by the gap d between each of the plurality of plates 12, 22, ..., (10n+2) and the signal line SL, and by the area S overlapping between each of the plurality of plates 12, 22, ..., (10n+2) and the signal line SL. Accordingly, the stiffness of the plurality of plates 12, 22, ..., (10n+2) and the stiffness of the plurality of support units 11, 21, ..., (10m+1) may also affect the capacitances $C_1, C_2, \ldots, C_n$. Additionally, the distance by which each of the plurality of plates 12, 22, ..., (10n+2) moves toward the signal line SL may be determined according to the driving voltage and the initial capacitance of each of the variable capacitors VC#1, VC#2, ..., VC#n.

If a negative DC driving voltage is applied to the ground line GL and if a positive DC driving voltage is applied to each of the plurality of plates 12, 22, ..., (10n+2), the electrostatic force may be exerted to cause the ground line GL to pull the plates 12, 22, ..., (10n+2), so that each of the plates 12, 22, ..., (10n+2) may move toward the line unit 10. Therefore, each of the variable capacitors VC#1, VC#2, ..., VC#n may generate different capacitance, according to the distance of movement of the plates 12, 22, ..., (10n+2) toward the line unit 10. Here, the distance of movement of the plates 12, 22, ..., (10n+2) toward the line unit 10 may be different according to the stiffness of each of the plates 12, 22, ..., (10n+2).

For example, the greater the stiffness of the plates 12, 22, ..., (10n+2) is, the smaller will be the distance of movement of the plates 12, 22, ..., (10n+2). Accordingly, the gap d between each of the plurality of plates 12, 22, ..., (10n+2) and the signal line SL may increase, and the capacitance may thus be reduced. In other words, the stiffness of the plates 12, 22, ..., (10n+2) is inversely proportional to the distance of movement of the plates 12, 22, ..., (10n+2), and to the capacitance. This is because the capacitance is inversely proportional to the size of the gap d between each of the plurality of plates 12, 22, ..., (10n+2) and the signal line SL, namely, the gap d between the upper electrode and lower electrode.

The variable capacitors VC#1, VC#2, ..., VC#n may have different pull-in voltages. For example, the pull-in voltages increase sequentially from the first capacitor VC#1 to the n-th capacitor VC#n. A pull-in voltage refers to a voltage occurring when an upper electrode is adhered to a lower electrode with a dielectric interposed therebetween. If the applied driving voltage reaches a pull-in voltage of one selected from among the plurality of plates 12, 22, ..., (10n+2), a gap between the selected plate and the signal line SL may be reduced to the minimum level so that the maximum capacitance may be generated. The pull-in voltages of the variable capacitors VC#1, VC#2, ..., VC#n may be influenced by the stiffness of the plurality of plates 12, 22, ..., (10n+2) or the stiffness of the plurality of support units 11, 21, ..., (10m+1).

For example, if the driving voltage increases prior to reaching a first pull-in voltage $V_{Pf}\#1$ of the first capacitor VC#1, a gap between the first plate 12 and the signal line SL may be gradually reduced but capacitance $C_1$ of the first capacitor VC#1 may increase. If the applied driving voltage reaches the first pull-in voltage $V_{PI}$#1, an upper electrode and a lower electrode of the first capacitor VC#1 may be adhered with a dielectric layer interposed therebetween, so that the gap between the first plate 12 and the signal line SL may be reduced to the minimum level. In other words, when the first pull-in voltage VPI#1 is applied, the first plate 12 used as an upper electrode is adhered to the signal line SL used as a lower electrode, with an air gap formed therebetween, so the gap d between the first plate 12 and the signal line SL may be reduced to the minimum level, and capacitance $C_1$ may be maximized. In this situation, if pull-in voltages of other variable capacitors VC#2, . . . , VC#n are greater than the first pull-in voltage $V_{PI}$#1, capacitances $C_2$, $C_3$, . . . , $C_n$ may gradually increase as the driving voltage increases.

Figure 3:
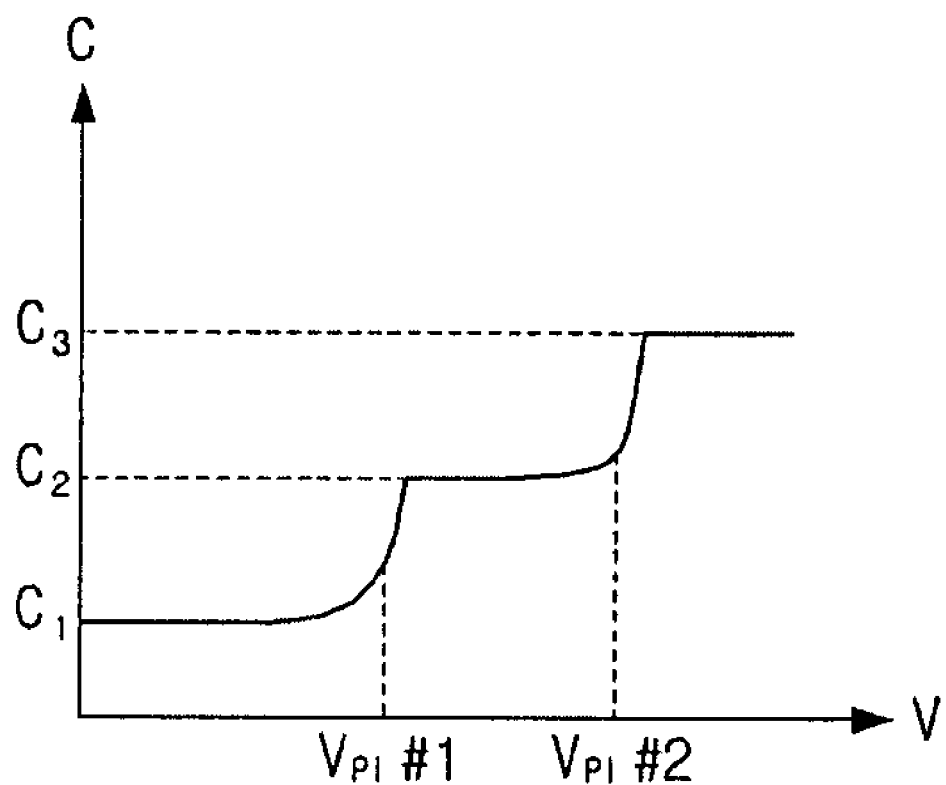
FIG. 3 is a graph showing capacitance generated by each capacitor according to the magnitude of applied driving voltage.

FIG. 3 is a graph showing the capacitance generated by each capacitor according to the magnitude of applied driving voltage. In FIG. 3, if the first plate 12 of the first capacitor VC#1 does not move even when an initial driving voltage is applied, the initial value of the first capacitance $C_1$ of the first capacitor VC#1 may remain unchanged. This is because the initial value of the first capacitance $C_1$ is designed to change when a driving voltage greater than a predetermined driving voltage is applied. If the driving voltage V increases and reaches the first pull-in voltage $V_{PI}$#1, the first capacitance $C_1$ of the first capacitor VC#1 may reach its maximum value. Additionally, since an initial value of a second capacitance $C_2$ of the second capacitor VC#2 is greater than the maximum value of the first capacitance $C_1$, the second capacitance $C_2$ of the second capacitor VC#2 may start to increase after a driving voltage greater than the first pull-in voltage $V_{PI}$#1 is applied, and may then reach its maximum value. The maximum value of the capacitance may be generated by each capacitor according to the magnitude of the pull-in voltage.

If the same driving voltage is applied concurrently to the first to n-th capacitors VC#1, VC#2, . . . , VC#n, the gap d may change due to the different degrees of stiffness of the capacitors VC#1, VC#2, . . . , VC#n, and the capacitances $C_1$, $C_2$, . . . , $C_n$ generated by the capacitors VC#1, VC#2, . . . , VC#n may also be different from one another. Since the variable capacitors VC#1, VC#2, . . . , VC#n have different pull-in voltages, the driving voltages at which the capacitances $C_1$, $C_2$, . . . , $C_n$ reach their maximum values are also different in magnitude, and the capacitances $C_1$, $C_2$, . . . , $C_n$ have different maximum values.

Therefore, when the variable capacitor apparatus 100 is employed in a matching circuit or a tunable filter, it is possible to perform impedance matching or multi-band frequency filtering or wide-band frequency filtering without having an additional switch. Additionally, it is possible to design the variable capacitor apparatus 100 to be able to perform wide-band tuning and multi-band tuning for the capacitance according to the type of RF systems including the variable capacitor apparatus 100, by adjusting the stiffness and the number of capacitors, the magnitude of driving voltage and the magnitude of pull-in voltages of the capacitors VC#1, VC#2, . . . , VC#n.

For example, in a situation in which a frequency of approximately 1 GHz is filtered at a capacitance of approximately 1 picofarad and a frequency of approximately 2 GHz is filtered at a capacitance of approximately 2 picofarads, if the first capacitor VC#1 and second capacitor VC#2 are designed to generate the maximum capacitances of approximately 0.5 and approximately 1.5 picofarads, respectively, the first pull-in voltage $V_{PI}$#1 of the first capacitor VC#1 and the second pull-in voltage $V_{PI}$#2 of the second capacitor VC#2 may be applied to the variable capacitor apparatus 100. Accordingly, the variable capacitor apparatus 100 may generate a capacitance of approximately 2 picofarads so as to filter a signal corresponding to a frequency bandwidth of 2 GHz.

Figure 4A:
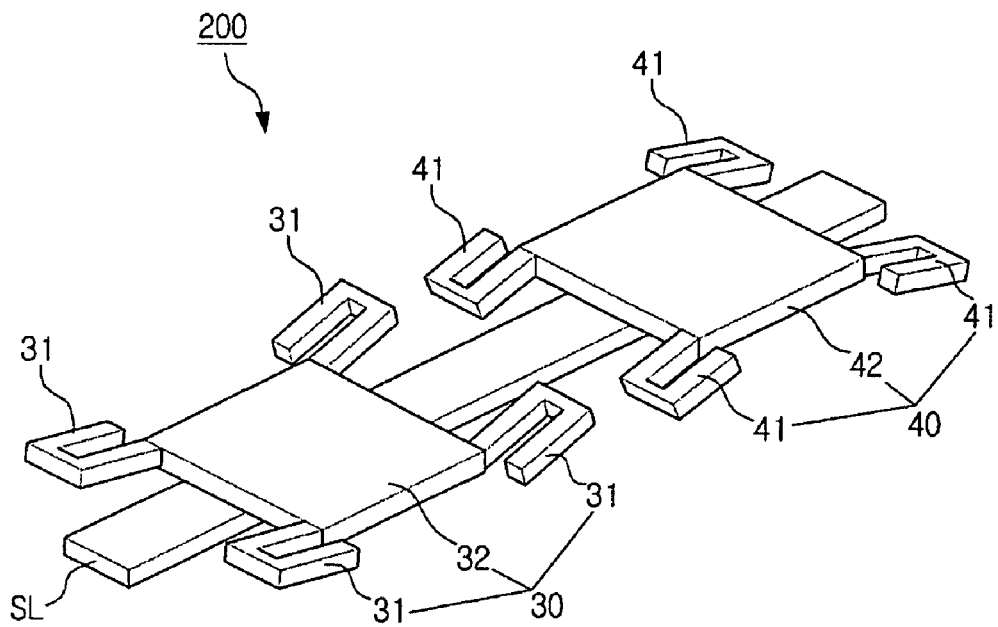
FIGS. 4A and 4B illustrate an array variable capacitor apparatus according to another exemplary embodiment of the present invention.
Figure 4B:
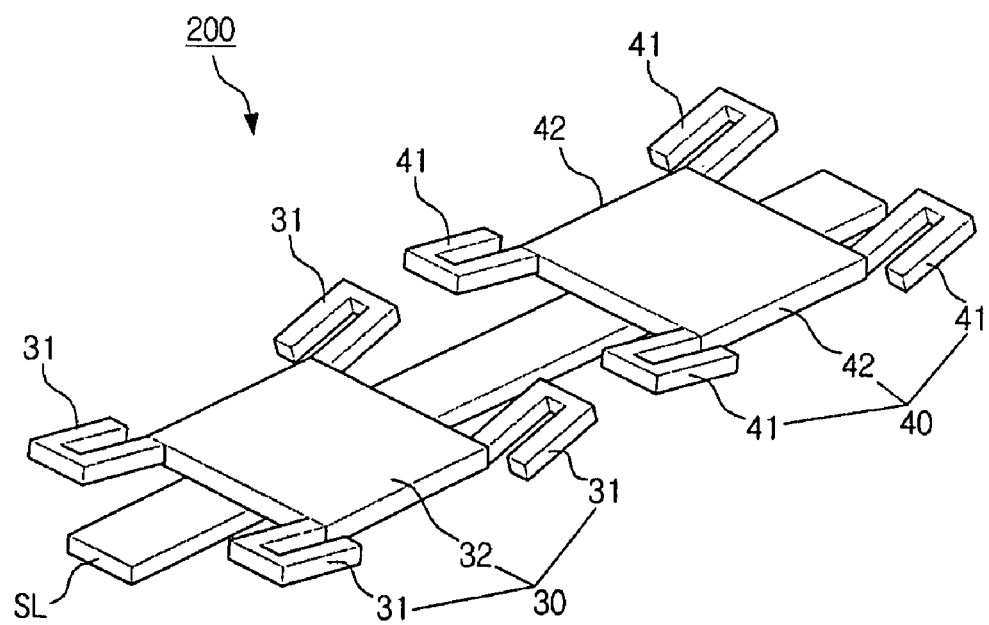

FIGS. 4A and 4B illustrate an array variable capacitor apparatus 200 according to another exemplary embodiment of the present invention.

Referring to FIG. 4A, a plurality of support units 31 and 41 are disposed at edges of each of plates 32 and 42. FIG. 4A illustrates a first capacitor 30 and a second capacitor 40 for convenience of description. The plates 32 and 42 are designed to have different degrees of stiffness, and the plurality of support units 31 and 41 may also be designed to have different degrees of stiffness. The support units 31 and 41 may be fabricated as membrane forms at the edges of the plates 32 and 42, as shown in FIG. 4A, which will affect not only the stiffness of the support units 31 and 41 but also the stiffness of the plates 32 and 42. The form of the support units 31 and 41 is not limited to the form shown here, and the support units 31 and 41 may have various forms.

If a driving voltage is applied to a signal line SL and each of the plates 32 and 42, a gap between the first capacitor 30 and the second capacitor 40 may be gradually reduced. For example, if the applied driving voltage reaches a pull-in voltage of the first capacitor 30, a gap between the first capacitor 30 and the signal line SL may be reduced to the minimum level so that a first capacitance $C_1$ may be maximized. In this situation, the support units 31 of the first capacitor 30 may be inclined to cause the plate 32 to be attached to the signal line SL, and the support units 41 of the second capacitor 40 may be inclined to cause the plate 42 to be separated from the signal line SL, as shown in FIG. 4A.

Subsequently, if the applied driving voltage reaches a pull-in voltage of the second capacitor 40, the plate 42 of the second capacitor 40 may be adhered to the signal line SL, as shown in FIG. 4B, so that a second capacitance $C_2$ may reach its maximum value.

Therefore, the variable capacitor apparatuses 100 and 200 according to the exemplary embodiments of the present invention are applicable to a tunable filter or a matching circuit required to implement a digital RF system or a reconfigurable RF system. Hence, the variable capacitor apparatuses 100 and 200 do not require additional switches for controlling the array configuration, so it is possible to achieve a reduction in size and in manufacturing cost. Additionally, it is possible to fabricate a high performance variable capacitor capable of performing wide-band tuning and multi band tuning by adjusting the capacitance according to changes in the stiffness and in the driving voltage.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:
1. An array variable capacitor apparatus comprising:
   a line unit comprising a ground line and a signal line which operates as a lower electrode; and
   a plurality of plates which are engaged with the line unit to generate capacitance and which operate as upper electrodes, the plurality of plates being arranged in an array pattern and having different degrees of stiffness.

2. The apparatus of claim 1, wherein, if a driving voltage is applied, an electrostatic force causes the plurality of plates to move toward the line unit and to generate the capacitance, and a gap between the upper electrode and the lower electrode changes according to the stiffness.

3. The apparatus of claim 2, wherein the stiffness of each of the plurality of plates is proportional to the size of the gap, but is inversely proportional to the capacitance.

4. The apparatus of claim 1, wherein the stiffness of each of the plurality of plates is adjusted according to at least one from among Young's modulus of each of the plurality of plates, the thickness of each of the plurality of plates and an area overlapping between each of the plurality of plates and the signal line.

5. The apparatus of claim 1, wherein the plurality of plates are spaced a part from an upper portion of the line unit and arranged in an array pattern.

6. The apparatus of claim 5, further comprising a plurality of support units for supporting the plurality of plates so that the plurality of plates are separated from the line unit.

7. The apparatus of claim 6, wherein the plurality of support units have different degrees of stiffness.

8. The apparatus of claim 6, wherein each pair of the plurality of support units is disposed at respective ends of each of the plurality of plates so as to form a bridge shape.

9. The apparatus of claim 6, wherein the plurality of support units are disposed in membrane forms at edges of each of the plurality of plates.

10. The apparatus of claim 1, wherein, if the applied driving voltage reaches a pull-in voltage of at least one plate from among the plurality of plates, a gap between the at least one plate and the signal line is reduced to the minimum level so that the capacitance reaches the maximum value.

* * * * *